(12) United States Patent
Harris

(10) Patent No.: US 7,711,266 B1
(45) Date of Patent: May 4, 2010

(54) PMD MEASUREMENTS FOR AN IN-SERVICE FIBER SPAN

(75) Inventor: David Lindel Harris, Pleasanton, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 536 days.

(21) Appl. No.: 11/005,813

(22) Filed: Dec. 7, 2004

(51) Int. Cl.
*H04B 10/08* (2006.01)

(52) U.S. Cl. .............................. 398/25; 398/16; 398/34

(58) Field of Classification Search ................... 398/16, 398/25, 31, 34
See application file for complete search history.

(56) References Cited

U.S. PATENT DOCUMENTS 6,795,607 B1 * 9/2004 Archambault et al. ......... 385/24
2003/0039005 A1 * 2/2003 Roberts et al. .............. 359/122
2004/0151494 A1 * 8/2004 King et al. .................. 398/16
2004/0175171 A1 * 9/2004 Kokkinos .................... 398/14

* cited by examiner

*Primary Examiner*—Quan-Zhen Wang

(57) ABSTRACT

Systems and methods are disclosed for performing PMD tests on a fiber span that is in service. For a fiber span transporting data signals in data channels of a data bandwidth, the following methods may be used for PMD tests. For a first method, a light system transmits test signals over test channels outside of the data bandwidth onto the fiber span. The test channels may have wavelengths longer or shorter than the data channels. The PMD measurement system receives the test signals and measures PMD on the fiber span. For a second method, a light system transmits test signals over available channels in the data bandwidth onto the fiber span. The data bandwidth may not be fully utilized for transporting data, so there are data channels available for PMD testing. The PMD measurement system receives the test signals and measures PMD on the fiber span.

8 Claims, 7 Drawing Sheets

PMD MEASUREMENTS FOR AN IN-SERVICE FIBER SPAN

BACKGROUND OF THE INVENTION

1. Field of the Invention

The invention is related to the field of optical communication networks, and in particular, to systems and methods for performing Polarization Mode Dispersion (PMD) measurements on fiber spans that are in-service.

2. Statement of the Problem

Many communication companies use an optical network for transmitting data because of its high-bandwidth capacity. Fiber optic cables in the optical network reliably transport optical signals over long distances between a transmitter and a receiver. The fiber optic cables are comprised of transmission fiber, such as a single mode fiber (SMF). Over the length of SMF, the optical signals experience some degradation due to attenuation along the fiber. Fiber background loss in the fiber causes the attenuation, typically about 0.2 dB/km. The optical signals also degrade due to other limitations, such as Polarization Mode Dispersion (PMD), chromatic dispersion, and nonlinear effects.

PMD is a dynamic pulse broadening phenomena. In a single mode fiber, optical pulses propagating down the fiber may separate into two orthogonal modes of polarization that travel at different speeds. The relative amplitudes of these two pulses are determined by the state of polarization of the input pulse relative to the fiber's input principal states of polarization (PSP). The separation into the two orthogonal modes may be caused by intrinsic and extrinsic factors. The intrinsic factors may result from fiber manufacturing processes, such as core ellipticity, or built-in asymmetric stresses. The extrinsic factors may be caused by stresses due to twisting, bending, and environmental effects, such as temperature and thermal gradients.

If the core of the fiber has a perfectly circular cross-section, then both modes travel at the same speed over the same distance. Otherwise, one mode travels slower than the other resulting in a difference in group velocities (an effect called birefringence). The difference in velocities between polarization modes is wavelength dependent and time dependent. The difference in propagation time, $\alpha\tau$, experienced by the two polarization modes at a given wavelength is referred to as the differential group delay (DGD) with units in picoseconds (ps). When the DGD in a fiber becomes excessively large, a receiver is unable to distinguish between a zero bit and a one bit, and bit errors occur eventually resulting in a PMD-induced outage.

When fiber spans are installed, PMD tests are sometimes performed on the fiber spans while the fiber spans are still dark (i.e., no data traffic). The fiber spans are tested one at a time. To test a fiber span, a light source is connected to one end of the fiber span and a PMD measurement system is connected to the other end of the fiber span. The light source is a broadband light source having a bandwidth of about 100 nm. The broadband light source then transmits light over the fiber span, in the 100 nm bandwidth, for receipt by the PMD measurement system. The PMD measurement system then records PMD measurements for the transmitted light.

A broadband light source is used to shorten the time needed for PMD tests. There is an inverse relationship between bandwidth and the test time needed to obtain accurate PMD measurements. As the bandwidth of the light source narrows, the test time increases. As the bandwidth of the light source widens, the test time decreases. For instance, for a 100 nm bandwidth light source, the test time may be five minutes. For a 30 nm bandwidth light source, the test time may be two hours. For a 1 nm bandwidth light source, the test time may be ninety days. Thus, current testing is done with a broadband light source to shorten test time.

One problem with currently using a broadband light source is that testing can only be performed on a dark fiber span. Testing with a broadband light source cannot be performed on a fiber span carrying data signals, as the bandwidth of the broadband light source overlaps the data bandwidth for transporting data signals. For instance, if the data bandwidth for a fiber span in service is the C-band (1530 nm to 1565 nm), and a broadband light source having a bandwidth between 1500 nm and 1600 nm is used, the bandwidth of the broadband light source would overlap with the data bandwidth to corrupt the data. If a fiber span is in-service, the network engineers would have to take the fiber span out of service to perform PMD tests, which is undesirable.

Restricting PMD testing to dark fibers presents problems for network engineers as they may need to perform PMD tests on fiber spans that are in service. For instance, some optical networks are installed to transport data at a data rate of 2.5 Gbps. PMD does not significantly affect 2.5 Gbps networks, so PMD tests probably were not performed on fiber spans in these networks before they were put in-service. If network engineers want to increase a 2.5 Gbps network to a 10 Gbps network or higher, such as a 40 Gbps, then PMD does become an issue at these higher data rates. Network engineers do not know how the networks will perform at the 10 Gbps or higher data rate as PMD tests were not performed on the fiber spans. In order to increase the data rate to 10 Gbps or higher, network engineers would have to perform PMD tests on the fiber spans or risk PMD-induced outages. As stated before, PMD tests would require taking the fiber spans out of service.

A problem remains to provide for efficient in-service PMD testing of fiber spans.

SUMMARY OF THE SOLUTION

The invention helps solve the above problems by providing systems and methods that allow for PMD testing of fiber spans while the fiber spans remain in-service. By testing in-service, network engineers advantageously do not have to take fiber spans out of service to perform PMD tests, and do not have to go through the headache of re-routing data or requesting maintenance tickets to re-route data in order to take the fiber spans out of service. Network engineers can also upgrade networks from lower data rates to higher data rates more easily with in-service testing. Network engineers also do not need to rely on assumptions of PMD on fiber spans based on the age of the fiber and other factors.

Assume that a fiber span is transporting data signals in data channels of a data bandwidth. For the invention, a test system is used to perform PMD tests on the fiber span while the fiber span is transporting the data signals. The test system includes a light system, a PMD measurement system, and a control system.

In one embodiment, the light system transmits test signals over a plurality of test channels outside of the data bandwidth onto the fiber span. The test signals are transmitted concurrently with the data signals over the fiber span. The test channels may have wavelengths longer than the data channels in the data bandwidth, or wavelengths shorter than the data channels. The PMD measurement system receives the test signals transported over the fiber span, and measures PMD on the fiber span based on the test signals.

In another embodiment, the light system transmits test signals over available channels in the data bandwidth onto the fiber span. The data bandwidth may not be fully utilized for transporting data, so there are data channels available for PMD testing. The PMD measurement system receives the test signals transported over fiber span, and measures PMD on the fiber span based on the test signals.

The control system may be used to control the light system. In one embodiment, the control system identifies a plurality of available channels in the data bandwidth. The control system selects one of the available channels. The control system generates control signals to control the light system to transmit test signals over the selected available channel, and transmits the control signals to the light system. The control system then selects the next available channel and repeats the above steps.

In another embodiment, the control system identifies a plurality of available channels in the data bandwidth. The control system selects one of the available channels and determines a plurality of sub-channels in the available channel. The control system generates control signals to control the light system to transmit test signals over the sub-channels of the available channel, and transmits the control signals to the light system. The control system then selects the next available channel and repeats the above steps.

The invention may include other embodiments described below.

DESCRIPTION OF THE DRAWINGS

The same reference number represents the same element on all drawings.

DETAILED DESCRIPTION OF THE INVENTION

FIGS. 1-8 and the following description depict specific embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
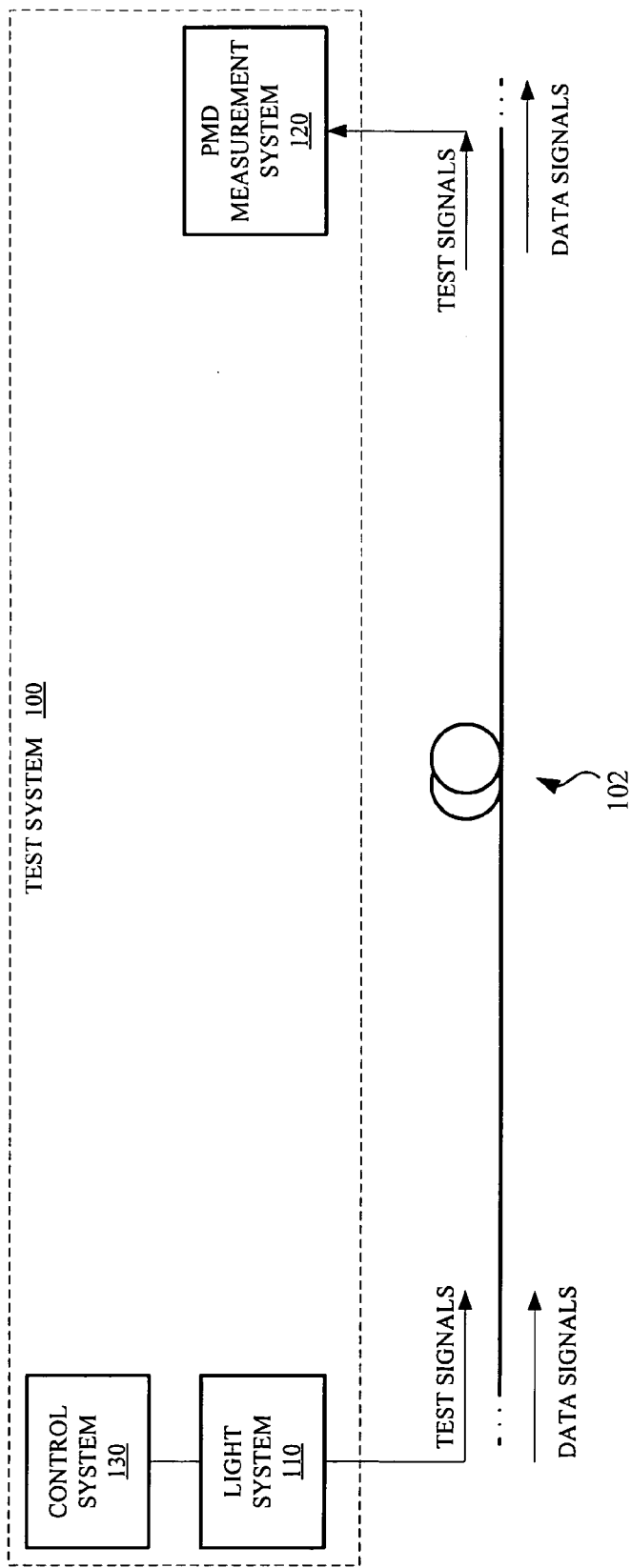
FIG. 1 illustrates a test system for testing a span of fiber that is in-service in an embodiment of the invention.

FIG. 1 illustrates a test system 100 for testing a span of fiber 102 that is in-service in an embodiment of the invention. Fiber span 102 may comprise a Single Mode Fiber (SMF) or any other transmission fiber that is in-service. "In-service" means that fiber span 102 is operable and is transporting light representing data signals. Fiber span 102 is transporting data signals in data channels of a data bandwidth. Data signals comprise any light beams that represent data. A data channel comprises any wavelength or wavelength band configured to transport data. A data bandwidth comprises a spectrum of wavelengths designated for data transport in a network.

To test for PMD on fiber span 102, test system 100 comprises a light system 110 and a PMD measurement system 120. Light system 110 is configured to transmit test signals over fiber span 102. Test signals comprise any light beams transmitted over fiber span 102 to test for PMD on fiber span 102. PMD measurement system 120 is configured to receive the test signals, and measure PMD of the fiber span 102 based on the test signals. Light system 110 and PMD measurement system 120 may be coupled in multiple locations to perform the PMD test on fiber span 102, which will be illustrated in the subsequent description.

In some embodiments, test system 100 further comprises a control system 130. Control system 130 is configured to control light system 110 to transmit the test signals over fiber span 102.

Figure 2:
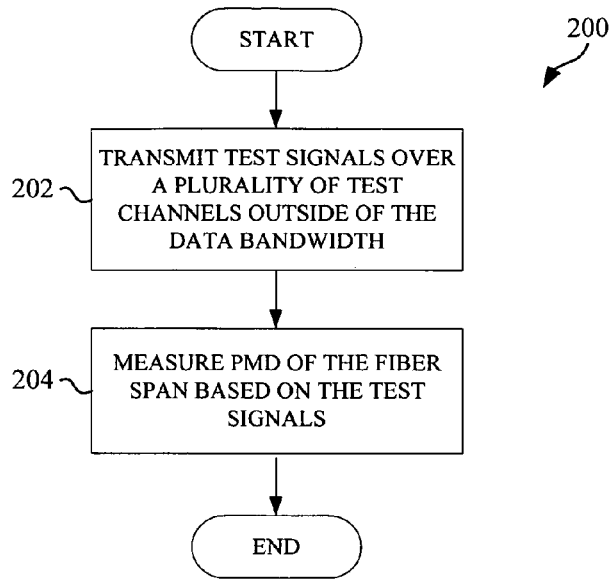
FIG. 2 is a flow chart illustrating one method of operating the test system to perform PMD tests in an embodiment of the invention.

Using test system 100 in FIG. 1, network engineers may perform PMD tests on fiber span 102 while fiber span 102 is in-service. The tests may be performed in multiple ways. FIG. 2 is a flow chart illustrating one method 200 of operating test system 100 to perform the PMD tests in an embodiment of the invention. In step 202, light system 110 transmits test signals over a plurality of test channels outside of the data bandwidth onto fiber span 102. The test signals are transmitted concurrently with the data signals over fiber span 102. The test channels may have wavelengths longer than the data channels in the data bandwidth, or wavelengths shorter than the data channels. For instance, assume that the data bandwidth comprises the C-band (1530 nm-1565 nm). The test channels may be in the L-band (longer wavelengths), in the S-band (shorter wavelengths), or another band. In this embodiment, light system 110 may comprise a broadband light system so that the number of test channels is large enough to keep the test time as low as possible. The test channels are not to bleed or overlap into the data channels. A filter may be used in series with light system 110 to ensure that the test channels do not interfere with the data channels. For instance, if an L-band broadband light system is used, an L-band filter may be installed to block any light that may leak into the data bandwidth.

In step 204, PMD measurement system 204 receives the test signals transported over fiber span 102, and measures PMD on fiber span 102 based on the test signals.

Figure 3:
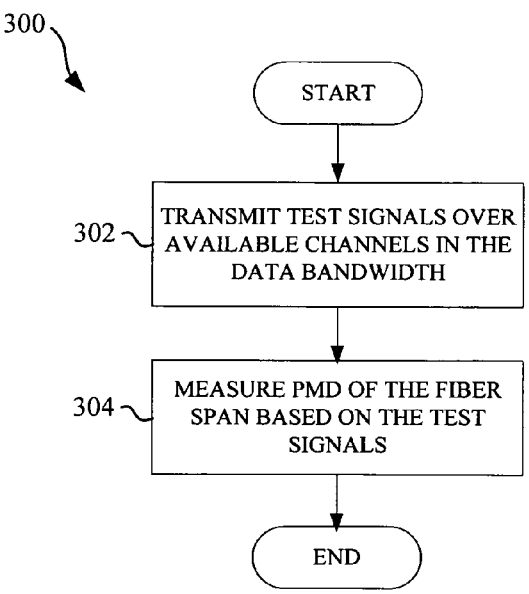
FIG. 3 is a flow chart illustrating another method of operating the test system to perform PMD tests in an embodiment of the invention.

FIG. 3 is a flow chart illustrating another method 300 of operating test system 100 to perform the PMD tests in an embodiment of the invention. In step 302, light system 110 transmits test signals over available channels in the data bandwidth onto fiber span 102. The test signals are transmitted concurrently with the data signals over fiber span 102. The data bandwidth may not be fully utilized for transporting data. For instance, the data bandwidth may comprise eighty data channels, and only thirty of the data channels are actually used to transport data. Therefore, fifty of the data channels are available. Light system 110 may use the fifty available channels for the PMD tests. In this embodiment, light system 110 may comprise a tunable laser or another precise light-generating device that can accurately transmit test signals over a single data channel so as to not interfere with adjacent data channels. In step 304, PMD measurement system 120 receives the test signals transported over fiber span 102, and measures PMD on fiber span 102 based on the test signals.

Figure 4:
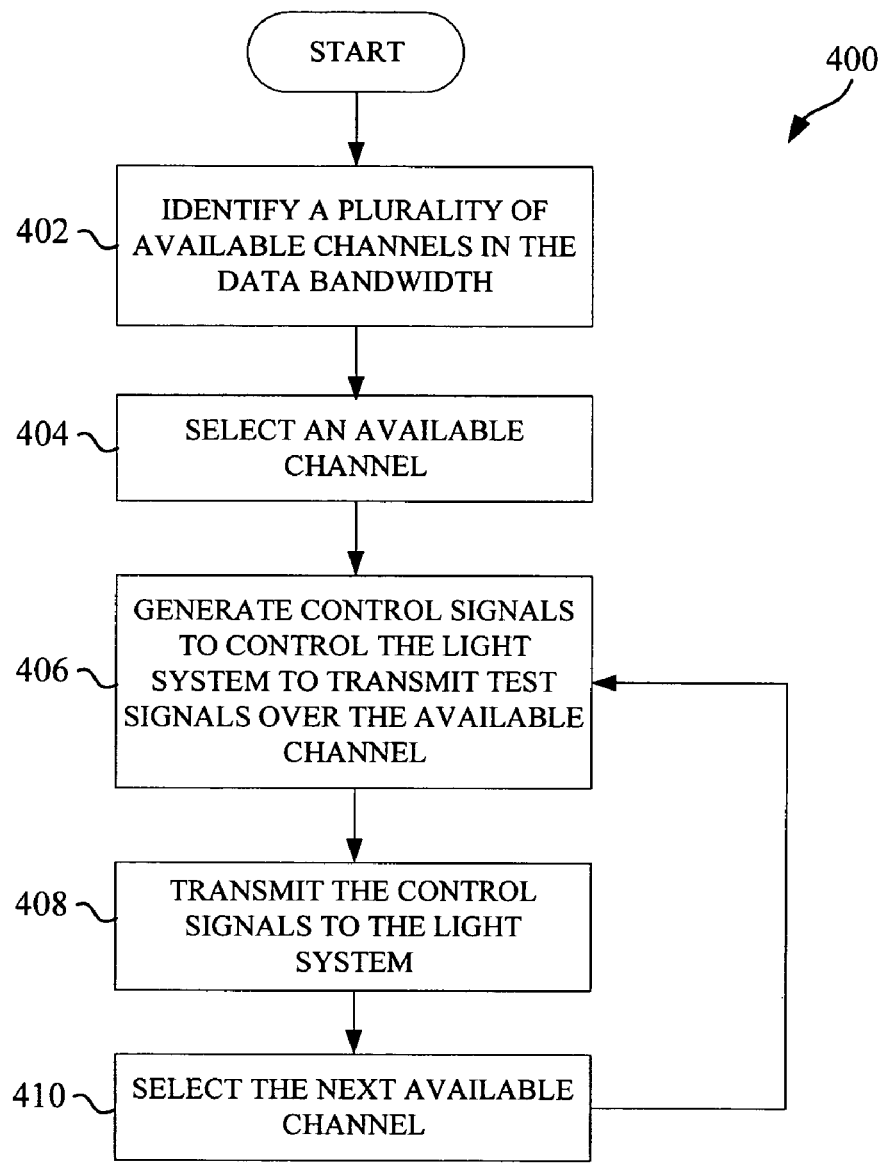
FIG. 4 is a flow chart illustrating a method of controlling a light system in an embodiment of the invention.

In this embodiment, control system 130 may be used to control light system 110. FIG. 4 is a flow chart illustrating a method 400 of controlling light system 110 in an embodiment of the invention. In step 402, control system 130 identifies a plurality of available channels in the data bandwidth. The available channels are known and may be programmed into control system 130 or accessible by control system 130. In step 404, control system 130 selects one of the available channels. In step 406, control system 130 generates control signals to control light system 110 to transmit test signals over the selected available channel. In step 408, control system 130 transmits the control signals to light system 110. In step 410, control system 130 selects the next available channel and repeats steps 406-410.

Figure 5:
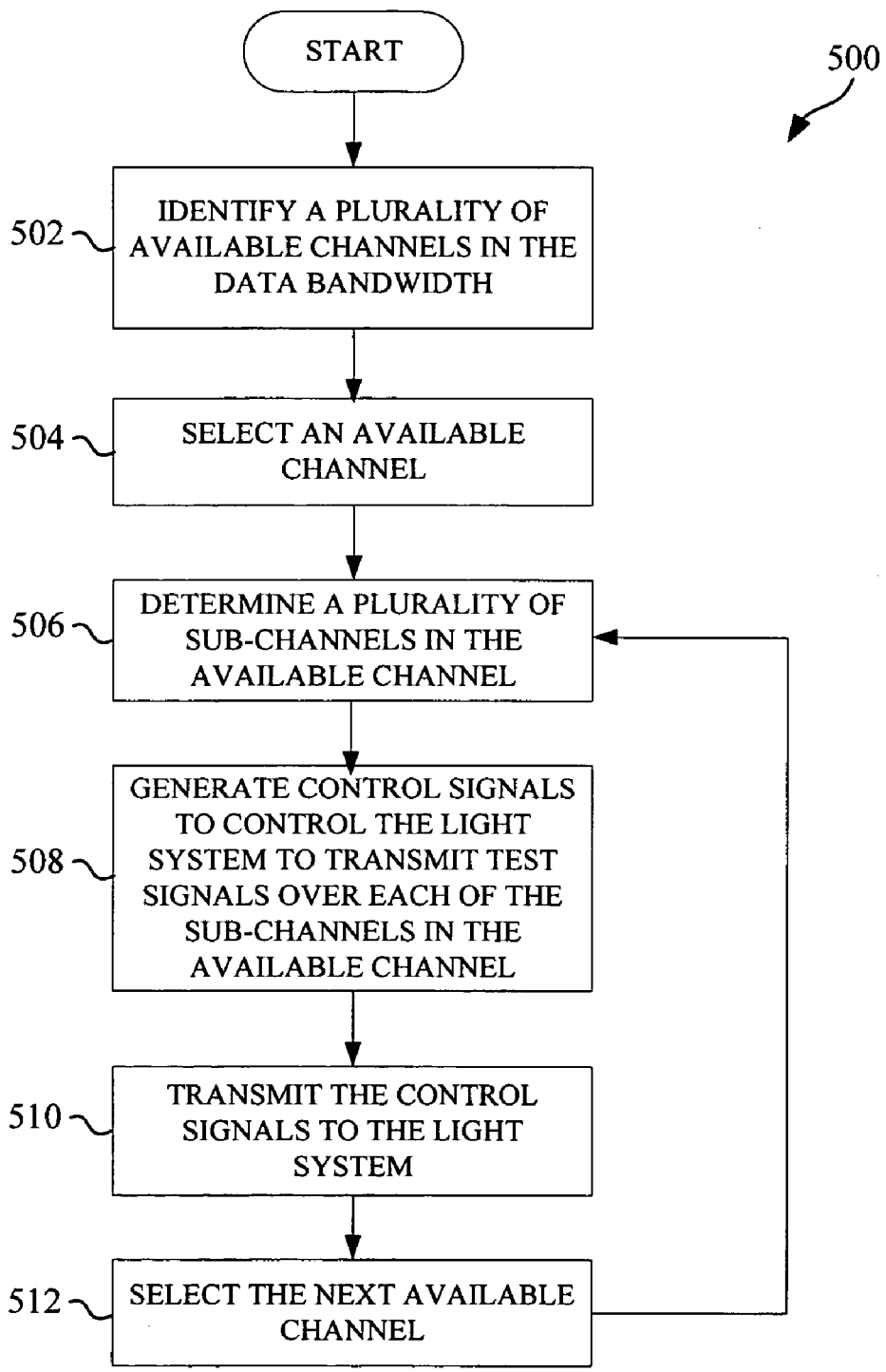
FIG. 5 is a flow chart illustrating another method of controlling a light system in an embodiment of the invention.

FIG. 5 is a flow chart illustrating another method 500 of controlling light system 110 in an embodiment of the invention. In step 502, control system 130 identifies a plurality of available channels in the data bandwidth. In step 504, control system 130 selects one of the available channels. In step 506, control system 130 determines a plurality of sub-channels in the available channel. For instance, a single data channel may have a channel bandwidth of about 100 GHz (0.80 nm). In the channel bandwidth, eight sub-channels may be designated at 12.5 GHz (0.1 nm) intervals. These sub-channels can be determined for each of the available channels.

In step 508, control system 130 generates control signals to control light system 110 to transmit test signals over the sub-channels of the available channel. In step 510, control system 130 transmits the control signals to light system 110. In step 512, control system 130 selects the next available channel and repeats steps 506-512.

The above-described control system 130 may be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Control system 130 may also be coupled to PMD measurement system 120. The systems may communicate with one another via wirelines, or satellite signals, radio signals, microwave, or any other wireless signals. Under control of control system 130, PMD measurement system 120 measures PMD on fiber span 102. PMD measurement system 120 may transmit the PMD measurements to control system 130. After receiving the PMD measurements, control system 130 may indicate the PMD measurements to network engineers, such as through a GUI, or may generate a plot of the PMD measurements for evaluation by the network engineers. Control system 130 may also log the measurements taken for each fiber span.

To implement test system 100, light system 110 and PMD measurement system 120 may be connected in different locations to perform the PMD tests. The location of light system 110 and PMD measurement system 120 depends on a number of factors. One factor is whether there are existing taps on fiber span 102. The taps may be part of the amplifiers connected to the fiber spans (such as an L-band tap), or another existing tap. If taps exist, then light system 110 and PMD measurement system 120 may be coupled to opposing ends of fiber span 102 to perform PMD tests on the individual fiber span. If taps do not exist, then light system 110 and PMD measurement system 120 may be coupled to terminals of the network.

Another factor is whether network engineers want to measure PMD on a single fiber span, on multiple fiber spans, or on an entire link.

Figure 6:
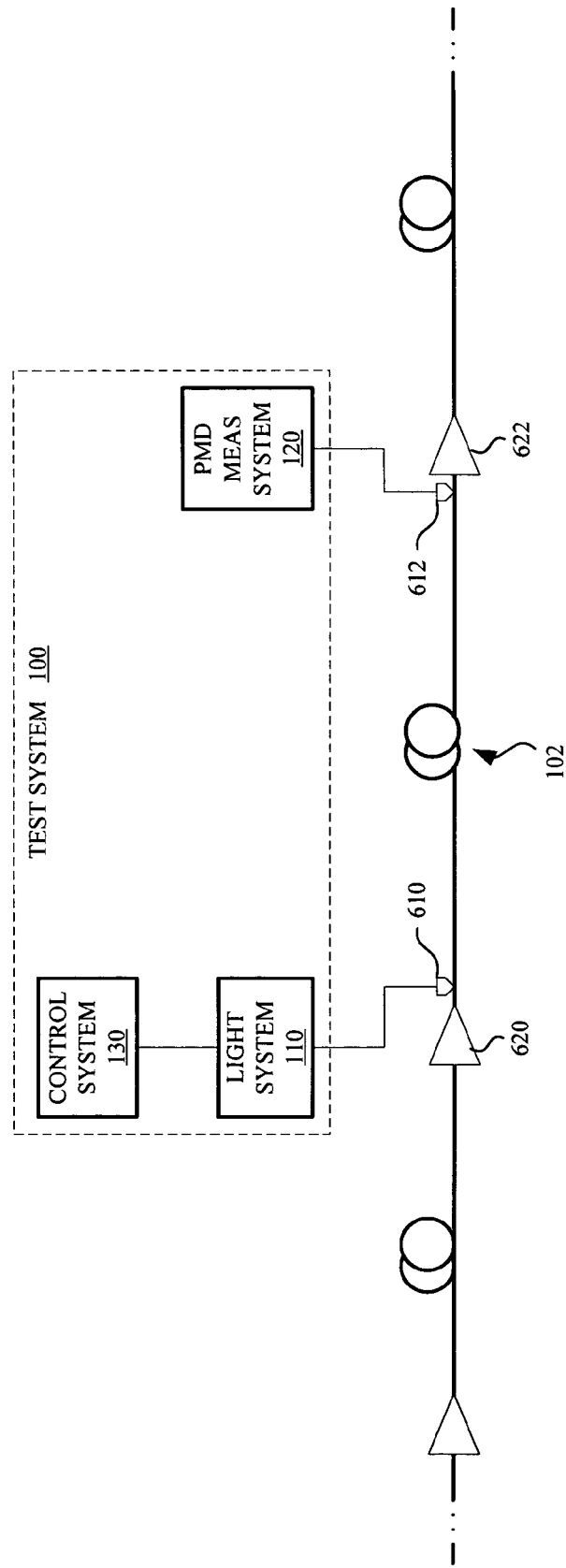
FIGS. 6-8 illustrate different configurations for a test system in an embodiment of the invention.

FIG. 6 illustrates one configuration for test system 100 in an embodiment of the invention. In this embodiment, light system 110 is coupled to a first end of fiber span 102, and PMD measurement system 120 is coupled to a second end of fiber span 102. Light system 110 is coupled to a tap 610 of fiber span 102. PMD measurement system 120 is coupled to another tap 612 of fiber span 102.

Taps 610 and 612 both exist on fiber span 102 and may comprise L-band taps. In newer fiber optic installations, C-band and L-band capabilities are included. Therefore, amplifier 620 is able to amplify both the C-band and the L-band. To perform this amplification, the C-band and the L-band signals are split in the amplifier, amplified separately, and then re-combined. Amplifier 620 includes an L-band tap used for this amplification. The L-band tap may be used to connect light system 110 to the first end of fiber span 102. Similarly, amplifier 622 includes an L-band tap used for amplification. The L-band tap may be used to connect PMD measurement system 120 to the second end of fiber span 102.

The configuration shown in FIG. 6 allows for testing of individual fiber spans or multiple fiber spans. Using the configuration of FIG. 6, either method 200 or 300 may be used to test PMD on fiber span 102.

Figure 7:
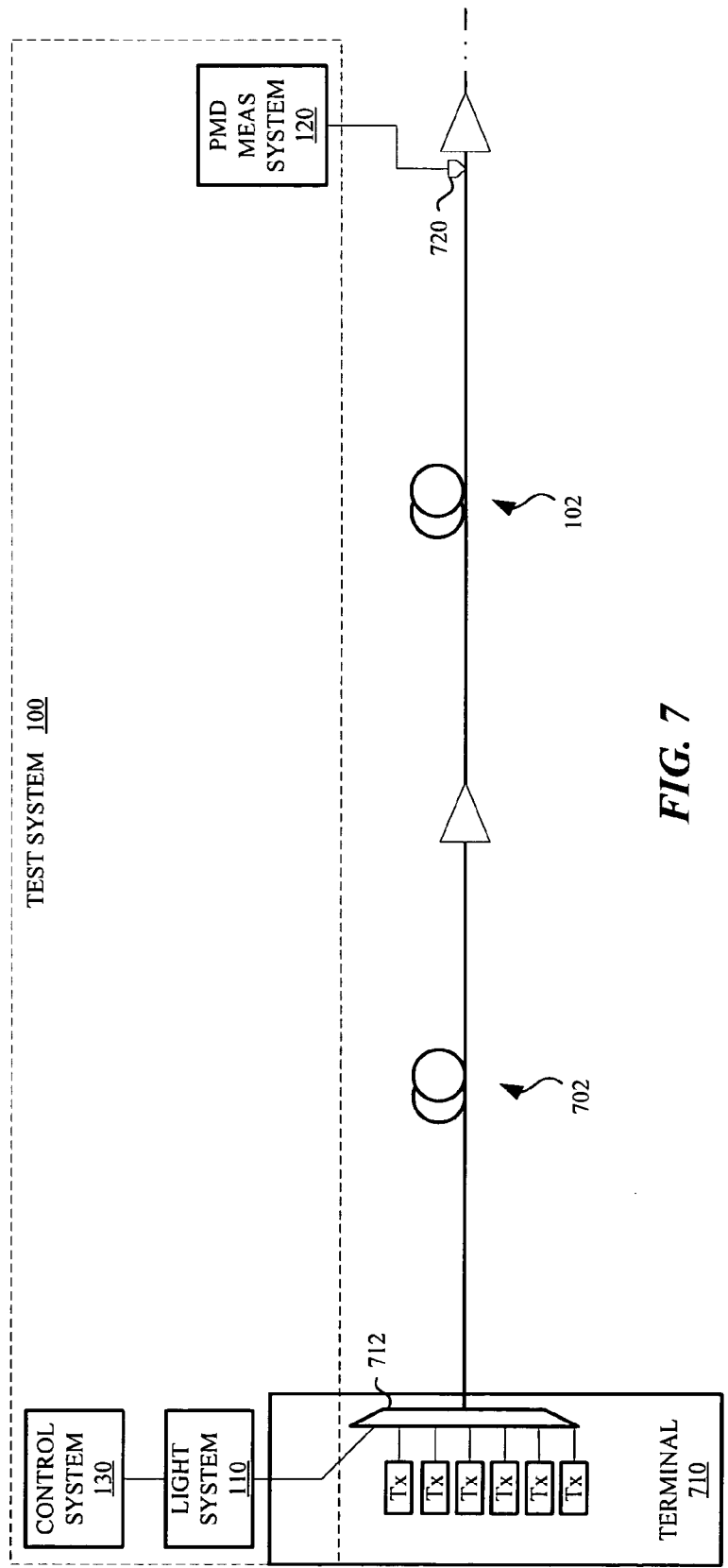

FIG. 7 illustrates another configuration for test system 100 in an embodiment of the invention. In FIG. 7, the network includes a link comprising fiber span 702 and fiber span 102. Light system 110 is coupled to a multiplexer 712 in terminal 710. Multiplexer 712 multiplexes data signals from multiple transmitters. Multiplexer 712 also multiplexes test signals transmitted by light system 110. Light system 110 may be connected to multiplexer 712 through a switch box or another apparatus.

PMD measurement system 120 is coupled to an end of fiber span 102 opposite the end where the test signals enter fiber span 102. PMD measurement system 120 is coupled to a tap 720 of fiber span 102. PMD measurement system 120 receives test signals over fiber span 102 and measures PMD on the combination of fiber span 702 and fiber span 102.

When measuring PMD over amplifiers as in FIG. 7, the power of the test signals produced by light system 110 needs to be controlled. The power of the test signals should be low enough that the amplifiers do not alter the gain balance across the test channels and the data channels. The power of the test signals also should be high enough for PMD measurement system 120 to receive the test signals. Control system 130 may control the power of light system 110.

Figure 8:
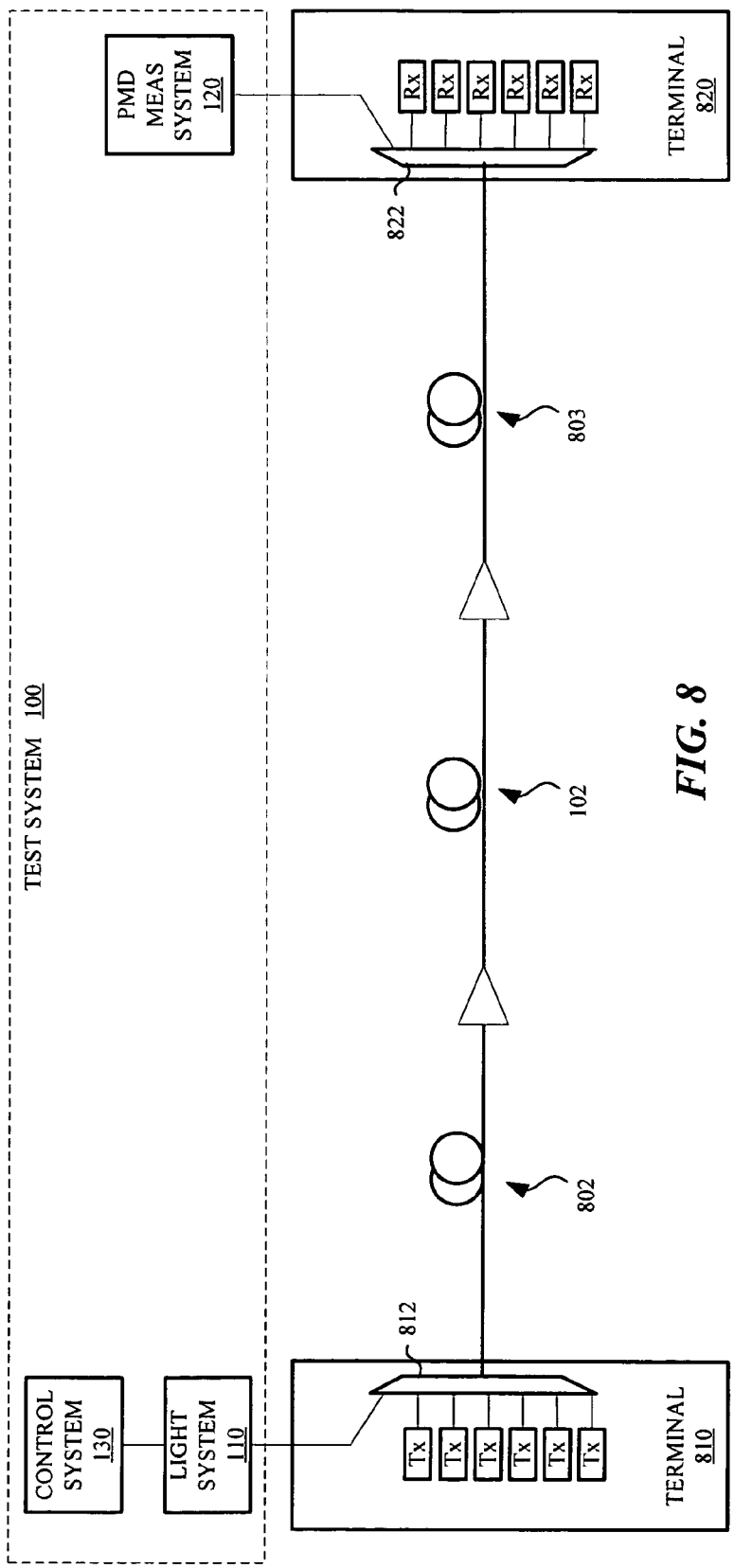

FIG. 8 illustrates another configuration for test system 100 in an embodiment of the invention. In FIG. 8, the network includes a link comprising fiber spans 802-803 and fiber span 102. Light system 110 is coupled to a multiplexer 812 in terminal 810. Multiplexer 812 multiplexes data signals from multiple transmitters. Multiplexer 812 also multiplexes test signals transmitted by light system 110. Light system 110 may be connected to multiplexer 812 through a switch box or another apparatus.

PMD measurement system 120 is coupled to a de-multiplexer 822 in another terminal 820. De-multiplexer 822 de-multiplexes light received over fiber span 803 into individual channels. De-multiplexer 822 transmits the data signals to receivers, and transmits the test signals to PMD measurement system 120. PMD measurement system 120 measures PMD on the link comprising fiber span 102 and fiber spans 802-803.

What is claimed is:

1. A method of testing for Polarization Mode Dispersion (PMD) in-service on a fiber span between a first terminal in a network and a second terminal in the network, the method comprising:
   in a control system, selecting a plurality of available data channels from data channels of a data bandwidth within the fiber span;
   in a light system, transmitting test signals based on the plurality of available data channels;
   in a filter system, filtering the test signals to prevent interference with the unavailable data channels;
   in a multiplexer located in the first terminal, receiving data signals from a plurality of transmitters in the first terminal, receiving the test signals from the filter system, transmitting the data signals in the data channels of the data bandwidth within the fiber span, wherein the fiber span has a bandwidth that comprises a first subsection and a second subsection and wherein the data bandwidth comprises the first subsection of the bandwidth, and transmitting the test signals over the plurality of available data channels in the data bandwidth concurrently with transmitting the data signals, wherein the data signals occupy a subset of the data channels of the data bandwidth and the test signals occupy the plurality of available data channels in the data bandwidth;
   in a de-multiplexer located in the second terminal, receiving the data signals and the test signals; and
   in a PMD measurement system coupled to the de-multiplexer, measuring PMD of the fiber span based on the test signals.

2. The method of claim 1 wherein
selecting the plurality of available data channels in the control system further comprises:
   (a) identifying the plurality of available data channels in the data bandwidth;
   (b) selecting a one of the plurality of available data channels;
   (c) generating control signals to control the light system to transmit the test signals over the one of the plurality of available data channels;
   (d) transmitting the control signals to the light system; and
   (e) selecting a next one of the plurality of available data channels and repeating steps (c) through (e).

3. The method of claim 1 wherein
selecting the plurality of available data channels in the control system further comprises:
   (a) identifying the plurality of available data channels in the data bandwidth;
   (b) selecting one of the plurality of available data channels;
   (c) determining a plurality of sub-channels in the one of the plurality of available data channels;
   (d) generating control signals to control the light system to transmit the test signals over the sub-channels of the one of the plurality of available data channels;
   (e) transmitting the control signals to the light system; and
   (f) selecting a next one of the plurality of available data channel and repeating steps (c) through (f).

4. The method of claim 1 wherein the fiber span bandwidth comprises an L-band, an S-band, and a C-band and wherein the data bandwidth comprises the C-band.

5. A test system for testing for Polarization Mode Dispersion (PMD) in-service on a fiber span between a first terminal in a network and a second terminal in the network, the test system comprising:
   a control system configured to select a plurality of available data channels from data channels of a data bandwidth within the fiber span;
   a light system configured to transmit test signals based on the plurality of available data channels;
   a filter system configured to filter the test signals to prevent interference with the unavailable data channels;
   a multiplexer located in the first terminal and configured to receive data signals from a plurality of transmitters, receive test signals from the filter system, transmit the data signals in the data channels of the data bandwidth within the fiber span, wherein the fiber span has a bandwidth that comprises a first subsection and a second subsection and wherein the data bandwidth comprises the first subsection of the bandwidth, and transmit the test signals over the plurality of available data channels in the data bandwidth concurrently with the data signals, wherein the data signals occupy a subset of the data channels of the data bandwidth and the test signals occupy the plurality of available data channels in the data bandwidth;
   a de-multiplexer located in the second terminal and configured to receive the data signals and the test signals; and
   a PMD measurement system configured to measure PMD of the fiber span based on the test signals.

6. The test system of claim 5 wherein to select the plurality of available data channels the control system is further configured to:
   (a) identify the plurality of available data channels in the data bandwidth;
   (b) select one of the plurality of available data channels;
   (c) generate control signals to control the light system to transmit the test signals over the one of the plurality of available data channels;
   (d) transmit the control signals to the light system; and
   (e) select a next one of the plurality of available data channels and repeat steps (c) through (e).

7. The test system of claim 5 wherein to select the plurality of available data channels the control system is further configured to:
   (a) identify the plurality of available data channels in the data bandwidth;
   (b) select a one of the plurality of available data channels;
   (c) determine a plurality of sub-channels in the plurality of available data channels;
   (d) generate control signals to control the light system to transmit the test signals over the sub-channels of the plurality of available data channels;
   (e) transmit the control signals to the light system; and
   (f) select a next one of the plurality of available data channels and repeat steps (c) through (f).

8. The test system of claim 5 wherein the fiber span bandwidth comprises an L-band, an S-band, and a C-band and wherein the data bandwidth comprises the C-band.

* * * * *